US012752743B2

(12) United States Patent
Scheller

(10) Patent No.: US 12,752,743 B2
(45) Date of Patent: Oct. 6, 2026

(54) METHOD FOR OPERATING A WIPER DEVICE

(71) Applicant: Robert Bosch GmbH, Stuttgart (DE)

(72) Inventor: Lothar Scheller, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 190 days.

(21) Appl. No.: 18/576,815

(22) PCT Filed: Apr. 8, 2022

(86) PCT No.: PCT/EP2022/059433
§ 371 (c)(1),
(2) Date: Jan. 5, 2024

(87) PCT Pub. No.: WO2022/233537
PCT Pub. Date: Nov. 10, 2022

(65) Prior Publication Data

US 2024/0326747 A1 Oct. 3, 2024

(30) Foreign Application Priority Data

May 5, 2021 (DE) ..................... 10 2021 204 527.8

(51) Int. Cl.
*B60S 1/08* (2006.01)
*B60S 1/34* (2006.01)
*B60S 1/04* (2006.01)

(52) U.S. Cl.
CPC ........... *B60S 1/0896* (2013.01); *B60S 1/3463* (2013.01); *B60S 1/0469* (2013.01)

(58) Field of Classification Search
CPC .... B60S 1/0896; B60S 1/3463; B60S 1/0469; B60S 1/0452; B60S 1/08
See application file for complete search history.

(56) References Cited

U.S. PATENT DOCUMENTS

2010/0139025 A1* 6/2010 Natsume ............... B60S 1/0896 15/250.31
2013/0119911 A1* 5/2013 Karcher .................... B60S 1/08 318/474
(Continued)

FOREIGN PATENT DOCUMENTS

DE 3628342 A1 2/1988
DE 19634559 A1 3/1998
(Continued)

OTHER PUBLICATIONS

Translation of International Search Report for Application No. PCT/EP2022/059433 dated Jul. 25, 2022 (2 pages).

*Primary Examiner* — Erin F Bergner
(74) *Attorney, Agent, or Firm* — Michael Best & Friedrich LLP

(57) ABSTRACT

The invention proceeds from a method for operating a wiper device (10) of a vehicle (26), which wiper device has at least one wiper arm (12, 12') for holding a wiper blade (14, 14'), in particular an aero wiper blade, at least one wiper drive (16) for driving the wiper arm (12, 12') and at least one computer unit (18) for controlling a wiping movement of the wiper arm (12, 12') using the wiper drive (16), wherein the computer unit (18) has a memory unit (20) in which a park position (22), which is associated with a position of the wiper drive (16), is stored.
The invention proposes that the computer unit (18) corrects the park position (22) as a function of a speed of the vehicle (26) in at least one adjustment step (24), wherein a corrected park position (28) lies, in particular in an incident-flow region of the wiper blade (14, 14').

3 Claims, 4 Drawing Sheets

(56) References Cited

U.S. PATENT DOCUMENTS

| | | | | |
|---|---|---|---|---|
| 2017/0225654 | A1 | 8/2017 | de Almeida et al. | |
| 2023/0163707 | A1* | 5/2023 | Murthy | H02P 23/24 318/400.02 |

FOREIGN PATENT DOCUMENTS

| | | | |
|---|---|---|---|
| DE | 10307959 | A1 | 9/2004 |
| DE | 102010039107 | A1 | 2/2012 |
| DE | 102019212513 | A1 | 2/2021 |
| EP | 1334889 | A2 | 8/2003 |

* cited by examiner

METHOD FOR OPERATING A WIPER DEVICE

BACKGROUND

A method has already been proposed for operating a wiper device of a vehicle which has at least one wiper arm for holding a wiper blade, in particular an aero wiper blade, at least one wiper drive for driving the wiper arm and at least one computing unit for controlling a wiping movement of the wiper arm by the wiper drive, the computing unit having a memory unit on which a park position assigned to a position of the wiper drive is stored.

SUMMARY

The invention is based on a method for operating a wiper device of a vehicle, which has at least one wiper arm for holding a wiper blade, in particular an aero wiper blade, at least one wiper drive for driving the wiper arm and at least one computing unit for controlling a wiping movement of the wiper arm by the wiper drive, the computing unit having a memory unit on which a park position assigned to a position of the wiper drive is stored.

It is proposed that in at least one adjustment step, the computing unit corrects a park position depending on a speed parameter of the vehicle, in particular in the upswing direction. Preferably, the wiper drive is brought into a corrected park position. Preferably, the corrected park position is always approached when the vehicle is moving at or above a defined speed. The corrected park position is located in particular in or above a wind roll created by a tear-off edge of a vehicle hood, so that an air flow essentially flows onto a spoiler surface of the wiper blade. Below the wind roller, the flow would essentially be directed onto the rear side of the wiper blade. The corrected park position is kept static, in particular at a vehicle speed greater than or equal to the defined speed, until a wiping operation is started and/or the speed of the vehicle falls below the defined speed. The corrected park position and/or the defined speed can vary depending on the vehicle model in particular.

A "wiper drive" is to be understood in particular as a device which is provided for a drive, in particular a pivoting drive, of at least one wiper arm, in particular of at least two wiper arms. Preferably, the wiper drive comprises at least one, in particular electric, drive motor. Combustion engines and/or other drive versions of the drive motor that a person skilled in the art would consider useful are also conceivable. In at least one operating state, the at least one wiper drive preferably swivels at least one wiper arm over a window pane, in particular for cleaning the window pane, in particular periodically from a rest position along an arc of a circle to a reversal point and back to the rest position.

Preferably, the wiper drive is captively connected to an object, in particular a motor vehicle. Preferably, the wiper drive is intended to drive at least one wiper arm. The wiper drive is particularly preferably designed to drive at least one wiper arm directly. By "to be driven directly" it should be understood that the wiper drive is directly connected to the one wiper arm that is driven directly, wherein the wiper drive can in particular also comprise a transmission, such as in particular a reduction transmission. Preferably, a "transmission" is to be understood as a device which is intended to ensure a transmission of force and/or a transmission of torque from an object, in particular a shaft, to another object, in particular another shaft. Preferably, the wiper drive is designed to directly drive one wiper arm to perform a wiping movement. The wiper drive is formed in particular by a direct drive. However, it would also be conceivable for the wiper drive to have a coupling linkage that mechanically connects two wiper arms together, with the wiper drive driving both wiper arms. Preferably, the wiper drive comprises an electric motor. In particular, the electric motor is designed to perform an oscillating movement. In principle, however, it would also be conceivable for the wiper drive to have at least one transmission that is designed to transfer a continuous rotary movement of the electric motor into an oscillating movement of the wiper arm. Preferably, the electric motor has an axis of rotation that corresponds to an axis of rotation of the wiper arm. In particular, the wiper arm is driven by the wiper drive to move relative to the windshield in at least one operating state. A connection between the at least one wiper arm and the at least one wiper drive can be supported by a connection unit. It is conceivable that the connection unit is intended for a rigid connection. A "rigid connection" is to be understood in particular as a fixed connection which is formed, for example, in the form of a weld seam and/or another connection which appears to a person skilled in the art to make sense. Preferably, each wiper arm of the wiper device is arranged on a wiper drive. Preferably, each wiper arm is driven directly by a wiper drive.

A "wiper arm" is to be understood in particular as a device which is intended to provide a connection from an object, in particular a vehicle, to a wiper blade for guiding the wiper blade on the windshield and to be captively mounted on the object, in particular the vehicle. Preferably, the at least one wiper arm is at least partially made of metal. Alternatively or additionally, it is conceivable that the wiper arm is at least partially made of a plastic, a composite material or another material that would appear useful to a person skilled in the art. A "wiper blade" is to be understood in particular as a replaceable device of the wiper arm drive device, which forms a contact area with a windshield, in particular a vehicle windshield, and is intended to be captively connected to the wiper arm.

A "park position" should preferably be understood as a position which a wiper arm of a wiper device assumes when the wiper device is statically in an idle state, in particular free from an activated wiping operation. In particular, the park position of the wiper arm, especially of an area of the wiper arm in which the wiper blade is arranged, essentially corresponds to the lowest turning point of the wiper arm during an oscillating swivel movement. However, it would also be conceivable for the park position to be below a lower reversal point of the wiper arm, for example if the wiper arm is moved further under a hood of the vehicle into the park position after a wiping operation. The park position is preferably arranged, in particular in the case of electronically controlled wiper devices, in particular below a lowest reversal point of the wiper arm of an oscillating swivel movement on a window to be wiped, in particular during a wiping process. In the park position, the wiper arm, in particular the area of the wiper arm in which the wiper blade is arranged, is preferably located in an area, in particular of maximum 30 cm, preferably maximum 15 cm, particularly preferably maximum 5 cm, of an edge, in particular a colored edge area, of a window to be wiped, in particular a motor vehicle window. It is conceivable that the park position of the wiper arm is arranged at the outer turning circle of a swivel movement on the pane to be wiped at a distance of maximum 50 cm, preferably maximum 30 cm, particularly preferably maximum 15 cm, from the lowest turning point of the wiper arm of an oscillating swivel movement on the pane to be wiped, in particular during a wiping process. It is also conceivable that the park position is arranged above or to the side of a highest reversal point of the wiper arm of an oscillating swivel movement on the window to be wiped, in particular during a wiping process. The "corrected park position" is in particular a changed park position, in which in particular a motor rotation position is adjusted in relation to the park position. The corrected park position and the park position are each formed by static wiper positions. In particular, the corrected park position is independent of the actual position of the wiper blade. In particular, the wiper blade can have a different orientation relative to the wiper drive compared to the park position due to an air flow, for example.

The term "computing unit" is understood in particular to mean a unit having an information input, information processing, and an information output. Advantageously, the computing unit comprises at least one processor, a storage, input and output means, further electrical components, an operating program, regulating routines, control routines, and/or calculation routines. The components of the computing unit are preferably arranged on a common board and/or advantageously arranged within a common housing. "Provided" is preferably to be understood as meaning specifically configured, specifically designed and/or specifically equipped. An object being provided for a specific function is preferably to be understood to mean that the object fulfils and/or carries out this specific function in at least one application and/or operating state.

In this context, a "speed parameter" is to be understood in particular as a parameter of the vehicle which provides information on the wind flow onto a windshield of the vehicle. The speed parameter can be formed both by a specific driving speed of the vehicle and by an acting wind speed. In particular, various speed parameters are conceivable that would appear useful to a person skilled in the art.

The method according to the invention can be used in particular to achieve an advantageously low/nominal park position when the vehicle is stationary and at low vehicle speeds, wherein at high vehicle speeds in particular a wind influence is compensated for. With wiper devices, the wiper blade is in a nominal park position. Due to aerodynamic effects, a load is applied to the wiper blade, which would shift the wiper blade out of the park position and cause the wiper blade to start vibrating on the windshield, which in turn would produce a very loud knocking noise on the windshield. The correction of the park position according to the invention can prevent the wiper blade from shifting into an unfavorable position due to wind. Instead, the wiper blade can be brought into a flow area in which a targeted wind load, in particular directed onto a spoiler surface of the wiper blade, holds the wiper blade in position and/or a speed-dependent wind load moves the wiper blade into a defined, advantageous position.

It is further proposed that, in the at least one adjustment step, the computing unit drives the wiper drive to move from the park position to a corrected park position depending on a speed of the vehicle. In particular, an angular In particular, an angular position of the wiper drive is changed by a defined value of the wiper drive is changed by a defined value. In particular, this makes it possible to adjust the position of the wiper arm depending on the speed.

Furthermore, it is proposed that the corrected park position is located in the upswing direction to the park position. In particular, the swing-up direction is a direction that points from the rest position and/or the park position in the direction of the upper reversal point. To move the wiper arm from the park position to the corrected park position, the wiper arm is therefore swiveled partially upwards in particular. This allows the wiper blade to be moved at least partially out of the slipstream of the vehicle hood.

It is further proposed that, in the at least one adjustment step, the computing unit drives the wiper drive to move from the park position to the corrected park position at a defined speed of the vehicle stored on the memory unit. The stored speed is in particular at least 100 km/h, preferably at least 120 km/h and particularly preferably at least 150 km/h. The stored speed can vary depending on the vehicle model. In particular, this prevents the wiper blade from shifting into an unfavorable position in the wind at high speeds. Furthermore, a predefined limit speed can be specified in particular. In particular, there is no need to measure current wind speeds.

It is further proposed that at speeds greater than or equal to the defined speed, the wiper arm is moved from the corrected park position into a further rest position, which at least approximately corresponds to the park position, by an incident flow, in particular an air flow, acting on a wiper blade connected to the wiper arm. In particular, this allows tension to be applied to the wiper arm, which prevents the wiper arm from dropping any further. Preferably, the corrected park position and/or the defined speed is designed in particular in such a way that a downward flow, in particular by the wind roller, onto the wiper blade is sufficient to statically push the wiper blade from the corrected park position into a further rest position, which at least approximately corresponds to the park position. The wiper drive remains at least approximately, in particular completely, in the corrected park position. Movement of the wiper blade is generated in particular by tensioning the wiper arm. In particular, this prevents the wiper blade from moving further out of the park position, especially further down, which would cause the wiper blade to start vibrating on the windshield, which in turn would produce a very loud knocking noise on the windshield. By tensioning the wiper arm, further wind shifting of the wiper blade into an unfavorable position can be avoided. By twisting/pretensioning the wiper arm and the wiper blade, the wind load in particular is balanced and the wiper arm or the wiper blade remain in the favorable flow direction. This prevents the wiper blade from vibrating or dancing. The computer unit can be adjusted to any aerodynamic load. A low park position can be achieved using the computer unit and this can be adjusted at high vehicle speeds so that the wiper arm is not/only slightly visible when the vehicle is stationary.

Furthermore, the invention is based on a wiper device for carrying out the method, with at least one wiper arm for holding a wiper blade, in particular an aero wiper blade, with at least one wiper drive for driving the wiper arm and with at least one computer unit for controlling a wiping movement of the wiper arm by the wiper drive. It is proposed that the computer unit has a memory unit on which exactly one park position assigned to a position of the wiper drive and exactly one corrected park position assigned to a position of the wiper drive are stored. The design of the wiper device according to the invention makes it possible in particular to achieve a wiper device with an advantageously low/nominal park position when stationary and at low vehicle speeds, wherein at high vehicle speeds it is possible in particular to compensate for the influence of wind. During operation of the wiper device, a load is applied to the wiper blade due to aerodynamic effects, which would shift the wiper blade out of the park position without the corrected park position and would cause the wiper blade to start vibrating on the windshield, which in turn would generate a very loud knocking noise on the windshield. The corrected park position according to the invention can prevent the wiper blade from shifting into an unfavorable position due to wind. Instead, the wiper blade can be brought into a flow area in which a targeted wind load, in particular directed onto a spoiler surface of the wiper blade, holds the wiper blade in position and/or a speed-dependent wind load moves the wiper blade into a defined, advantageous position.

Furthermore, it is proposed that the wiper arm has at least one clamping unit which is intended to exert a contact pressure on the wiper blade, the contact pressure applied by the clamping unit being a maximum of 14 Nm. Preferably, the tensioning unit comprises at least one spring element, which is arranged in a joint of the wiper arm. The spring element is formed in particular by a tension spring. However, another design of the spring element that would appear sensible to a person skilled in the art would also be conceivable. A "spring element" is to be understood in particular as a macroscopic element which has at least one extension which in a normal operating state is elastically variable by at least 10%, in particular by at least 20%, preferably by at least 30% and particularly advantageously by at least 50%, and which in particular generates a counterforce which is dependent on a change in the extension and preferably proportional to the change and which counteracts the change. An "extension" of an element is in particular understood to mean a maximum distance between two points of a perpendicular projection of the element onto a plane. The term "macroscopic element" is in particular understood to mean an element having an extension of at least 1 mm, in particular at least 5 mm, and preferably at least 10 mm.

The method according to the invention and the wiper device are not intended to be limited to the application and embodiment described above. In particular, the method according to the invention and the wiper device can have a number of individual elements, components and units and method steps that differs from the number of elements, components and units and method steps mentioned herein in order to fulfill a function described herein. Moreover, regarding the ranges of values indicated in this disclosure, values lying within the limits specified hereinabove are also intended to be considered as disclosed and usable as desired.

BRIEF DESCRIPTION OF THE DRAWINGS

Further advantages follow from the description of the following drawings. The drawing shows an exemplary embodiment of the invention. The drawing, the description, and the claims contain numerous features in combination. A skilled person will appropriately also consider the features individually and combine them into additional advantageous combinations.

Here.

DETAILED DESCRIPTION

Figure 1:
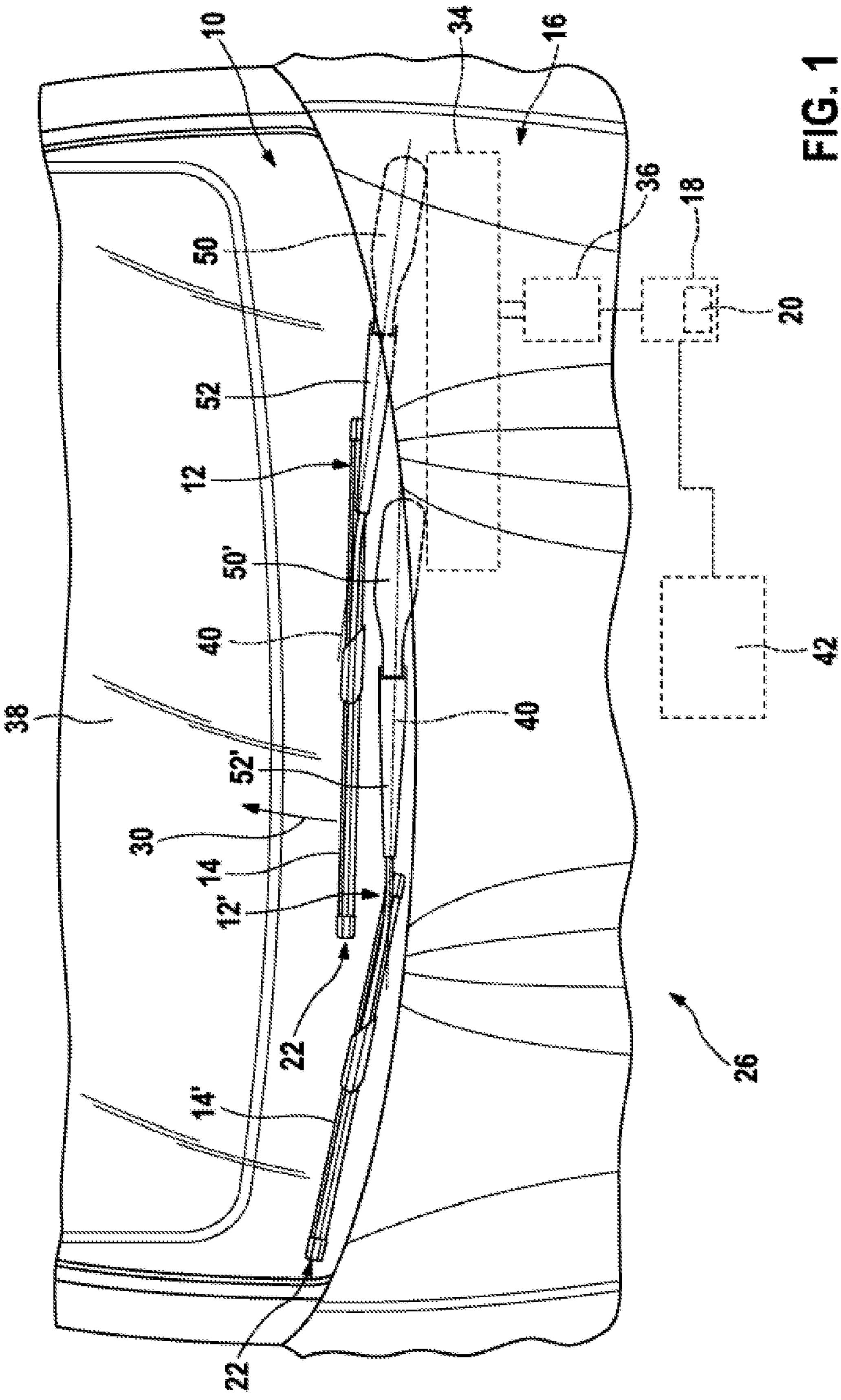
FIG. 1 a wiper device according to the invention with two wiper arms for holding one wiper blade each, with a wiper drive for driving the wiper arms and with a computer unit in a first operating position in the park position, FIG. 2 a wiper device according to the invention with two wiper arms for holding one wiper blade each, with a wiper drive for driving the wiper arms and with a computer unit in a second operating position in the park position, FIG. 3 a wiper device according to the invention with two wiper arms for holding one wiper blade each, with a wiper drive for driving the wiper arms and with a computer unit in a third operating position in the corrected park position, and FIG. 4 a schematic flow diagram of a method according to the invention for operating the wiper device.

FIG. 1 shows a wiper device 10. The wiper device 10 comprises two wiper arms 12, 12' and two wiper blades 14, 14'. The wiper arms 12, 12' are designed to accommodate the wiper blades 14, 14'. The wiper blades 14, 14' are formed in particular by aero wiper blades. In each case, one of the wiper arms 12, 12' and one of the wiper blades 14, 14' form a windshield wiper for cleaning a vehicle windshield 38. The wiper arms 12, 12' each comprise two hinged wiper arms 50, 50', 52, 52'. Furthermore, the wiper arms 12, 12' each have a clamping unit 33. The clamping units 33 are each arranged between the wiper arms 50, 50', 52, 52'. The clamping units 33 are intended to exert a contact pressure on the wiper blade 14, 14', wherein the contact pressure applied by the clamping unit 33 is a maximum of 14 Nm. The tensioning units 33 each comprise a spring element, not shown further, which is arranged in a joint of the respective wiper arm 12, 12'. The spring element is formed by a tension spring.

The wiper device 10 comprises a wiper drive 16 for driving the wiper arms 12, 12'. The wiper drive 16 has a wiper transmission 34 and a motor unit 36. The motor unit 36 is exemplarily designed as a reversing motor. The wiper transmission 34 couples the motor unit 36 with the wiper arms 12, 12'. However, it would also be conceivable that two motor units 36 are provided, each of which is directly coupled to one of the wiper arms 12, 12'. The motor unit 36 can swivel the wiper arms 12, 12' over the vehicle windshield 38. The motor unit 36 can swivel the wiper arms 12, 12' from a park position 22, 28 to a turning position and back. The park position 22, 28 is a position in which a longitudinal axis 40, 40' of the wiper arms 12, 12' is arranged parallel to a longest outer edge of the vehicle windshield 38, except for deviations of a maximum of 15°. The wiping movement of the wiper arms 12, 12' is limited to one swivel movement between two turning positions. One of the turning positions is a position of the wiper arms 12, 12' during the wiping movement in which the wiper arms 12, 12' are at a maximum distance from the park position 22, 28. A further reversing position is a position of the wiper arms 12, 12' during the wiping movement in which the wiper arms 12, 12' are minimally spaced from the park position 22, 28 during the wiping movement. The further turning position can coincide with the park position 22, 28.

The wiper device 10 comprises a computer unit 18 for controlling a wiping movement of the wiper arms 12, 12' by the wiper drive 16. The computer unit 18 comprises a microcontroller. Furthermore, the computer unit 18 has a memory unit 20. The memory unit 20 is intended for storing data and parameters. Parameters for the park position 22, 28 and the turning positions are stored on the memory unit 20. A park position 22 assigned to a position of the wiper drive 16 is stored on the memory unit 20. Furthermore, a corrected park position 28 assigned to a position of the wiper drive 16 is stored on the memory unit 20. Exactly one park position 22 assigned to a position of the wiper drive 16 and exactly one corrected park position 28 assigned to a position of the wiper drive 16 are stored on the memory unit 20. The park positions 22, 28 are each assigned to rotation angle positions of the motor unit 36. The computer unit 18 is connected to the on-board electronics 42 of a vehicle 26 for data exchange. The computer unit 18 receives data on the speed of the vehicle 26, for example, via the on-board electronics

42. The computer unit 18 is designed to carry out a method described below (see FIG. 4).

The corrected park position 28 lies in or above a wind roll created by a tear-off edge of a hood of the vehicle 26, so that an air flow essentially flows against a spoiler surface of the wiper blade 14, 14'. Below the wind roller, the air would essentially flow onto the rear side of the wiper blade 14, 14'. The corrected park position 28 is kept static at a speed of the vehicle 26 greater than/equal to the defined speed until a wiping operation is started and/or the speed of the vehicle 26 falls below the defined speed. The corrected park position 28 and/or the defined speed can vary depending on the vehicle model.

Figure 4:
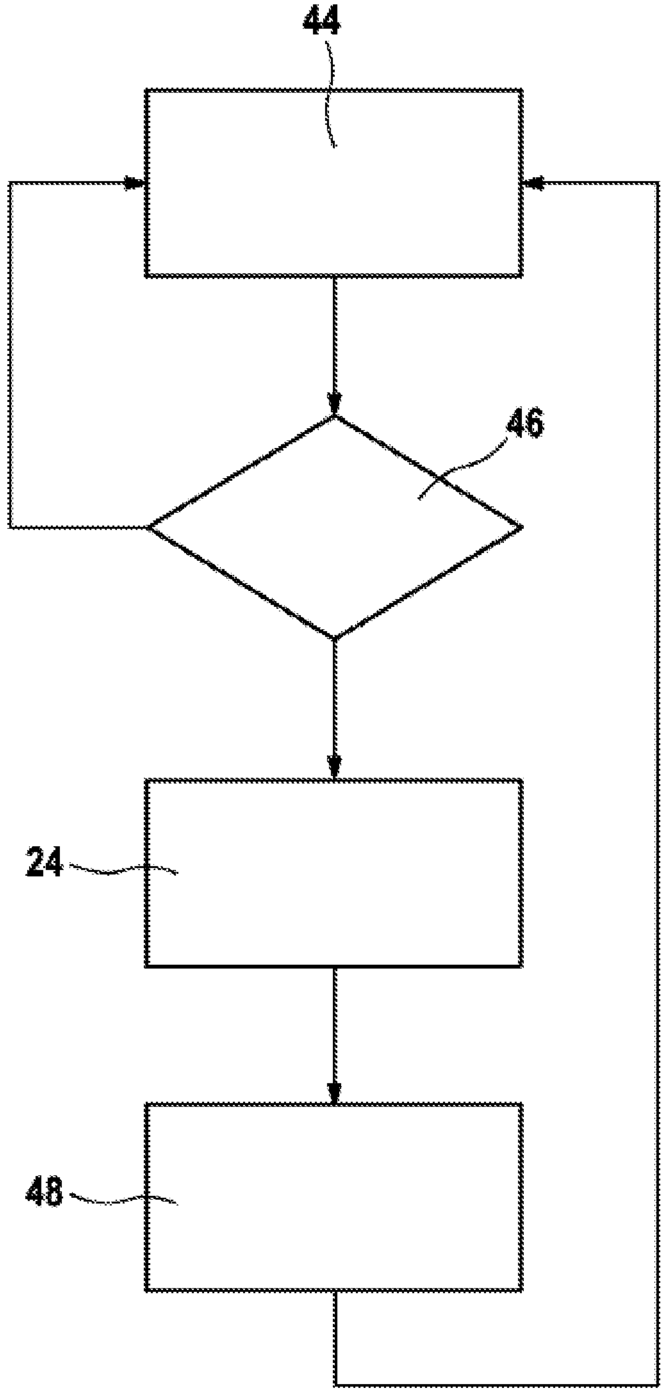

FIG. 4 schematically shows method steps of the method for operating the wiper device 10 of the vehicle 26. The method is carried out by the computer unit 18. The method is carried out when the vehicle 26 moves, if no wiping operation of the wiper device 10 is currently taking place.

Figure 2:
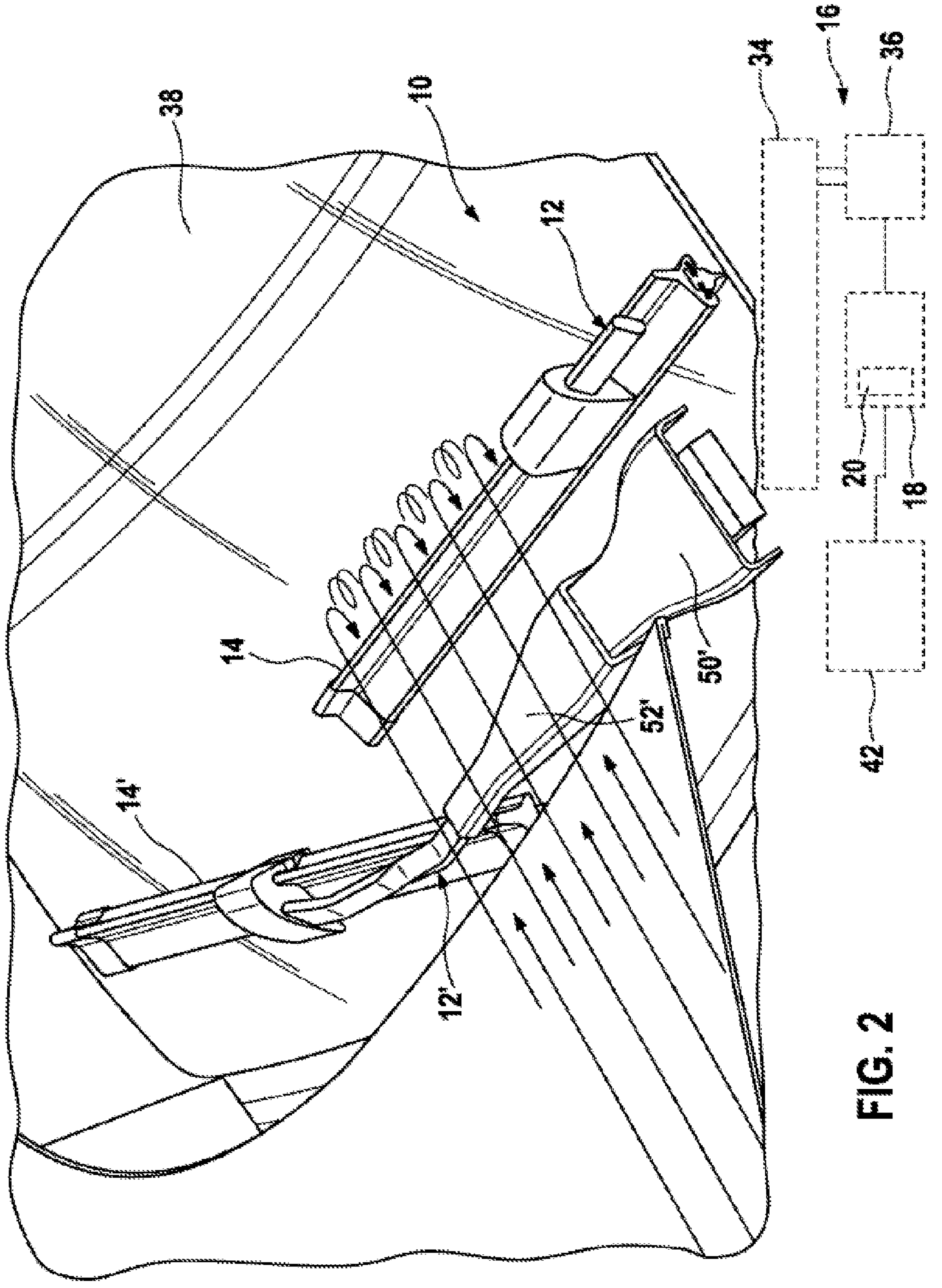
Figure 3:
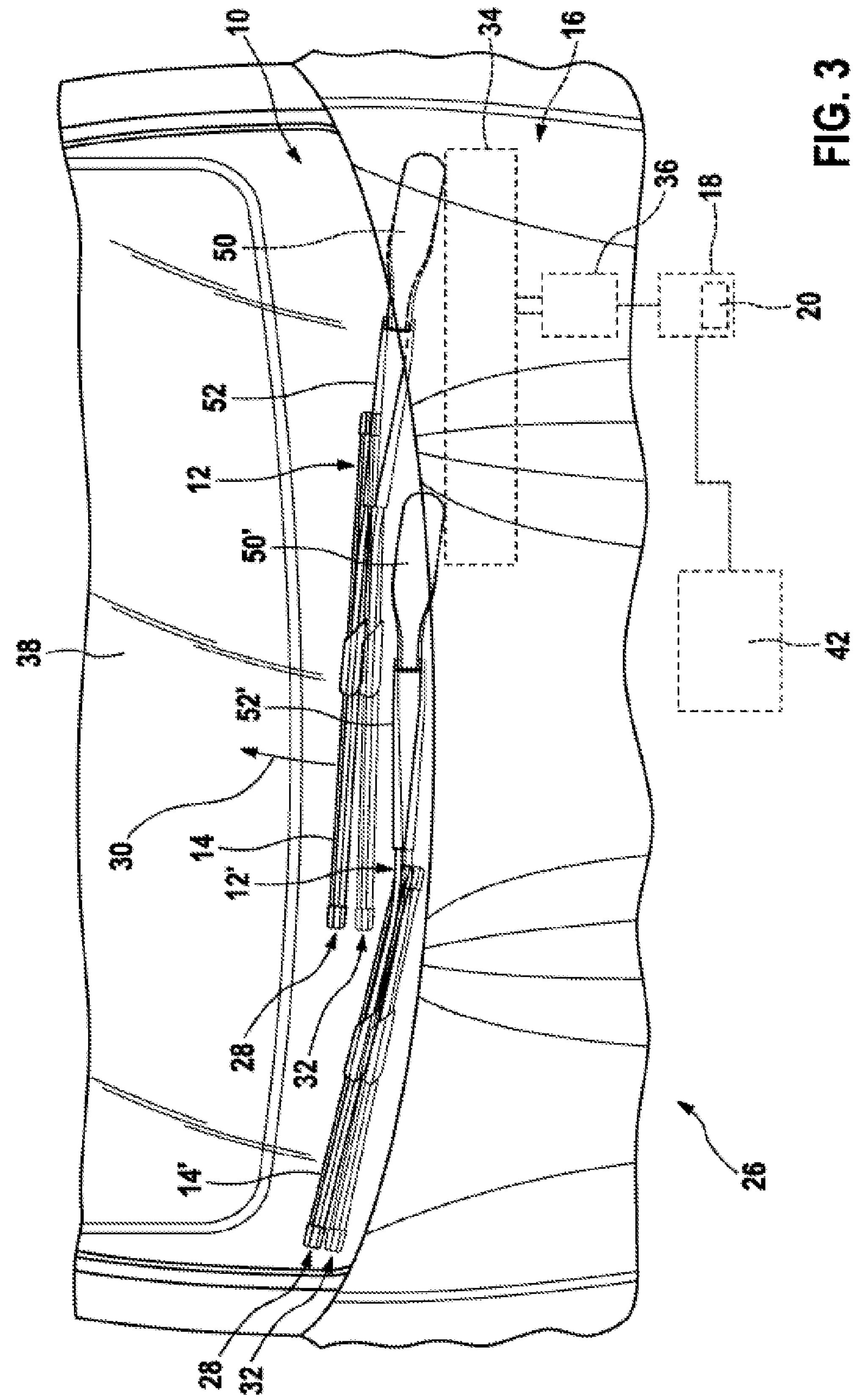

In the method, the wiper drive 16 is brought into the park position 22 and/or held in the park position 22 in a positioning step 44. The positioning step 44 can take place, for example, when the vehicle 26 is started and/or after the wiper drive 16 has been operated (FIG. 1). This is followed by a detection step 46, in which a current speed of the vehicle 26 is monitored. The computer unit 18 receives the data on the speed of the vehicle 26 from the on-board electronics 42. In the detection step 46, it is monitored whether the speed of the vehicle 26 reaches and/or exceeds a limit speed stored on the memory unit 20. The speed limit is 180 km/h, for example. However, it would also be conceivable to use a different speed limit that would appear reasonable to an expert. If the speed of the vehicle 26 is below the limit speed, the positioning step 44 is repeated. If the speed of the vehicle 26 reaches or exceeds the limit speed, an adjustment step 24 takes place. In the adjustment step 24, the computer unit 18 corrects the park position 22 as a function of a speed of the vehicle 26, with a corrected park position 28 lying in an inflow range of the wiper blade 14. In the adjustment step 24, the computer unit 18 drives the wiper drive 16 to move from the park position 22 to the corrected park position 28, depending on a speed of the vehicle 26. In the adjustment step 24, the computer unit 18 drives the wiper drive 16 to move from the park position 22 to the corrected park position 28 when the vehicle 26 reaches or exceeds the limit speed (FIG. 3). An angular position of the wiper drive 16 is changed by a defined value. In the at least one adjustment step 24, the computer unit 18 drives the wiper drive 16 to move from the park position 22 to the corrected park position 28 at a defined speed of the vehicle 26, namely the limit speed, stored on the memory unit 20. The corrected park position 28 is located in the upswing direction 30 to the park position 22. To move the wiper arm 12, 12' from the park position 22 into the corrected park position 28, the wiper arm 12, 12' is therefore partially pivoted upwards. The adjustment step 24 is followed by an inflow step 48 if the speed of the vehicle 26 is increased further. At speeds greater than or equal to the defined speed, the wiper arm 12, 12' is moved out of the corrected park position 28 into a further rest position 32 by an incident flow, in particular air flow, acting on a wiper blade 14, 14' connected to the wiper arm 12, 12', which corresponds at least approximately to the park position 22. The corrected park position 28 and the defined speed are designed in particular in such a way that a downward flow, in particular by a wind roller, onto the wiper blade 14 is sufficient to statically press the wiper blade 14, 14' from the corrected park position 28 into the further rest position 32, which corresponds at least approximately to the park position 22 (FIG. 2). The wiper drive 16 remains at least approximately in the corrected park position 28. A movement of the wiper blade 14, 14' is generated by tensioning the wiper arm 12, 12'.

The invention claimed is:

1. A method for operating a wiper device of a vehicle, which has a wiper arm for receiving a wiper blade, a wiper drive for driving the wiper arm and a computer for controlling a wiping movement of the wiper arm by the wiper drive, the computer having a memory on which a park position assigned to a position of the wiper drive for the vehicle when moving is stored, wherein, in an adjustment step, the computer corrects the park position as a function of a speed parameter of the vehicle, wherein the speed parameter is a non-zero speed, wherein the computer, in the adjustment step, drives the wiper drive to move from the park position to the corrected park position, wherein, while the wiper drive remains in a position corresponding to the corrected park position, an air incident flow acting on the wiper blade connected to the wiper arm moves the wiper arm from the corrected park position into a further rest position which corresponds to the park position when the speed parameter is greater than or equal to a defined speed.

2. The method according to claim 1, wherein the corrected park position is located in an upswing direction relative to the park position.

3. The method according to claim 1, wherein the computer, in the adjustment step, drives the wiper drive to move from the park position into the corrected park position at the defined speed of the vehicle stored on the memory.

* * * * *